June 4, 1946.　　　G. F. HALLIDAY　　　2,401,480
VALVE ACTUATION
Filed April 13, 1943　　　2 Sheets-Sheet 1

Inventor,
G. F. HALLIDAY
By Lacey & Lacey,
Attys.

June 4, 1946.  G. F. HALLIDAY  2,401,480
VALVE ACTUATION
Filed April 13, 1943  2 Sheets-Sheet 2
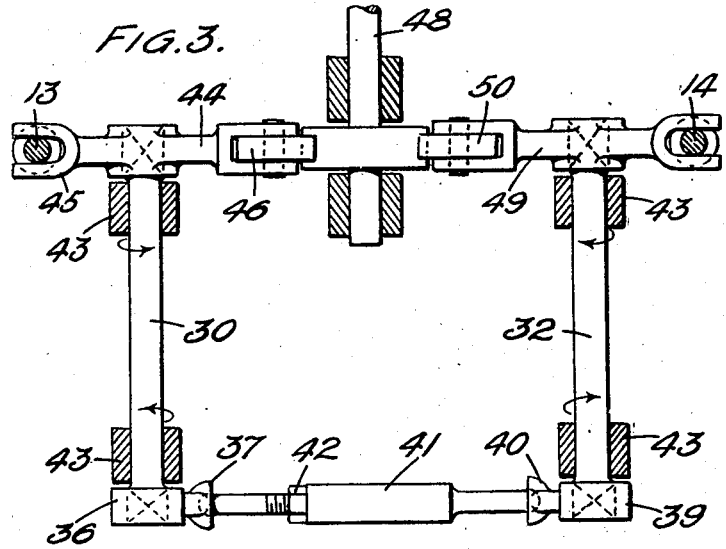
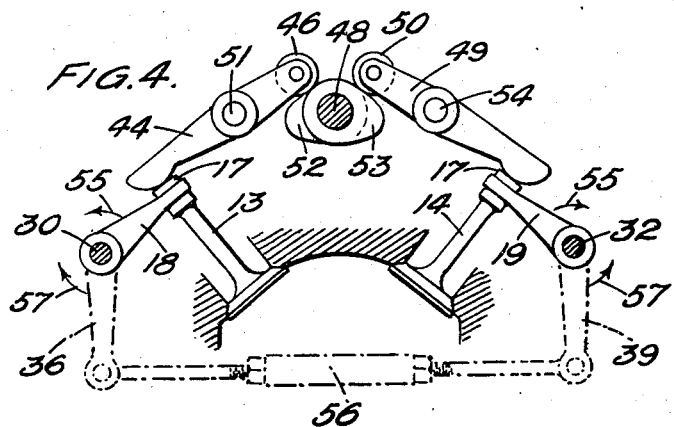
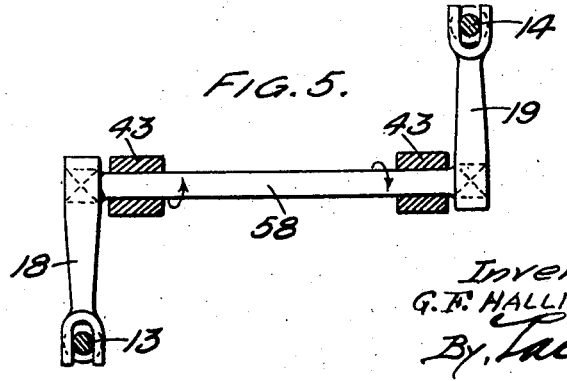

Patented June 4, 1946

2,401,480

UNITED STATES PATENT OFFICE 2,401,480

VALVE ACTUATION

George Frederic Halliday, Bristol, England, assignor to Aero Engines Limited, Bristol, England Application April 13, 1943, Serial No. 482,922
In Great Britain January 26, 1942

5 Claims. (Cl. 123—90)

This invention relates to valve mechanism and particularly to poppet and other valves for internal combustion engines.

It is the primary object of the present invention to provide improved means for spring influencing poppet and other valves, said means being relatively simple in construction and being capable of operating efficiently even at high speeds. It is a further object of the invention to provide a relatively compact construction of valve gear in which the valves are held closed by springs of the torsion bar type.

In valve mechanism including in combination with a pair of valves, means for opening said valves and resilient means for holding the valves closed, according to the present invention said resilient means comprises a torsion bar which is maintained under torsional stress and has its opposite end parts connected operatively with the pair of valves, respectively, so that the increase in torsional loading in the bar resulting from the opening movement of one of the valves increases the closing force exerted by the bar upon the other valve.

Further, there is provided according to the invention valve mechanism including in combination with a pair of valves, means for opening said valves, and resilient means for normally holding the valves closed, said resilient means comprising a pair of torsion bars each having one of its end parts operatively connected with the corresponding one of the pair of valves, whereby twisting of the bar moves said valve to its closed position, and a floating connection between the other end parts of the two torsion bars for maintaining both bars under torsional stress to close the valves, so that the increase in torsional loading in one bar resulting from the opening movement of the corresponding valve is transmitted to the other bar and causes the closing force exerted on the other valve to be increased. As a result of this arrangement it follows that opening movement of either one of the valves has the effect of increasing the torsional stress in both of the torsion bars, and where only one of the valves is required to be substantially open at any given instant, the improved arrangement enables smaller and/or more robust torsion bars to be designed than would be possible in the known prior arrangements, where a single torsion bar anchored at one end is used for closing each individual valve.

Preferably the floating connection comprises a pair of arms, one upon each bar, which arms are connected together by a link member, adjustable in length, the end parts of the bars adjacent the arms being supported in pivotal bearings. Conveniently each torsion bar extends longitudinally within a tube which transmits torque from one end of said bar, the tube being mounted in a fixed pivotal bearing. The adjustable link member provides a means of obtaining the initial torsional loads in the bars as required by dynamic or other considerations.

As a further aspect of the invention valve mechanism is provided in which actuating means for a pair of valves of the poppet type comprise, for each valve, a pivoted rocker operated by cam or equivalent mechanism to open the valve, and a torsion bar which latter is connected at one of its end parts to the rocker and has its other end part coupled by a floating connection with the corresponding end part of the torsion bar belonging to the other valve, both torsion bars being maintained in a state of torsional stress by the floating connection and both being arranged to co-operate in maintaining each of the valves in its closed position. Preferably each of the torsion bars is arranged coaxially with respect to the pivotal axis of the corresponding rocker, and if desired each rocker may comprise a tube through which the torsion bar extends, and which has axially spaced arms co-operating with the valve and the cam or equivalent mechanism.

The invention is illustrated by way of example in the accompanying diagrammatic drawings, in which:

Figure 3 represents in plan the general layout of a modified construction;

Figure 4 is an elevation, partly in section, showing a modified form of valve mechanism; and Figure 5 is a plan view of another arrangement according to the invention.

Figure 1:
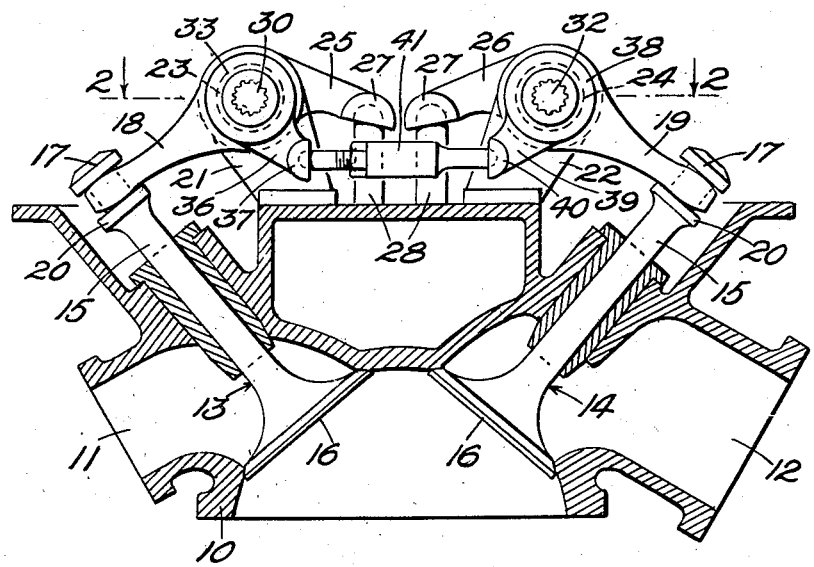
Figure 1 is an elevation, partly in section, of the cylinder head of an internal combustion engine, the section being taken on the line 1—1 of Figure 2.
Figure 2:
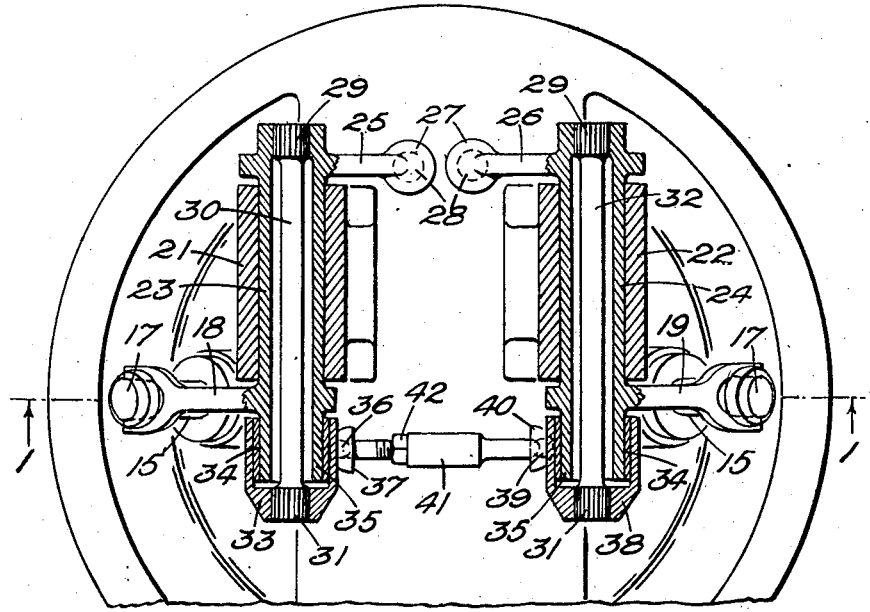
Figure 2 is a sectional plan of the valve operating mechanism, taken on the line 2—2 of Figure 1.

Referring firstly to Figures 1 and 2, the cylinder head, which is indicated at 10, is of the usual "overhead valve" type and is formed with an inlet manifold connection 11 and an exhaust connection 12. The inlet and exhaust valves, which are indicated at 13 and 14 respectively, are of the well-known poppet type, each having a stem 15 formed integrally with a head 16. However, adjacent its outer end each of the stems 15 is formed with a flange or collar 17, which is arranged to be engaged by the bifurcated end of the corresponding one of a pair of arms 18 and 19, so that an upward force exerted by said arm 18 or 19 is arranged to hold the valve 13 or 14 in its closed position. The arms 18 and 19 are also arranged to open the valves 13 and 14, and for this purpose each of the stems 15 is provided with a second flange or collar 20, the two collars or flanges on each stem being spaced axially by a sufficient distance to enable the bifurcated end of the arm 18 or 19 to fit snugly between them.

A pair of bearing brackets 21 and 22 are secured to, or formed integrally with, the cylinder head 10, and carry pivotally a pair of tubular sleeves 23 and 24, upon which latter the arms 18 and 19 respectively are formed or secured at positions closely adjacent the corresponding ends of the bearings 21 and 22. At its opposite end the sleeve 23 is also formed or fitted with a second arm 25, while a similar arm 26 is provided in conjunction with the sleeve 24. The ends of the arms 25 and 26 are formed with inverted socket cups 27, which are arranged to be engaged by the push rods 28 of the usual valve-actuating mechanism.

Adjacent the arm 25 the sleeve member 23 is reduced in diameter and is internally splined for engagement with the splined portion 29 of a torsion bar 30, which latter extends coaxially within the sleeve 23 and has its opposite end splined as indicated at 31. A cap 33, provided with a tubular bush 34, is rotatably mounted upon the end portion 35 of the sleeve 23, and is formed with a depending arm 36 having at its lower end a somewhat hemi-spherical socket member 37. The end wall of the cap 33 is formed with a splined aperture engaging with the corresponding splined end 31 of the torsion bar 30. A second torsion bar 32 disposed within the sleeve 24 is similarly shaped with splined ends 29 and 31, the former for non-rotational engagement with the end of the sleeve 24 adjacent the arm 26, while the other splined end engages with a cap 38 similar to the cap 33; the cap 38 is formed with a depending arm 39 having a socket 40, which latter faces the socket 37. A thrust member 41 constitutes a link or floating connection between the sockets 37 and 40 and is formed in two parts, which are screw-threaded together and provided with a lock nut 42 in order that the operative length of the thrust member 41 may be adjusted.

When the valve mechanism is assembled the torsion bars or shafts 30 and 32 are subjected to torsional stress in such a sense that both torsion bars act upon the arms 18 and 19 so as to urge the valves 13 and 14 to their closed positions. Thus the action of the torsion bar 30 upon the cap 33 tends to turn said cap in an anti-clockwise direction, as viewed in Figure 1, while the cap 38 tends to turn in a clockwise direction under the action of the torsion bar 32. The provision of the thrust member 41 enables these reactions to oppose one another and produces the advantageous result that both of the torsion bars 30 and 32 act in co-operation to hold each of the valves 13 and 14 in its closed position, thus enabling each of the torsion bars 30 and 32 to be of short and relatively compact construction. The closing force normally exerted by the torsion bars 30 and 32 can be regulated by adjusting the operative length of the thrust member 41. It will, of course, be appreciated that in an internal combustion engine there is generally only one valve per cylinder open to a substantial extent at any given instant, and in studying the action of the improved valve mechanism it will therefore suffice to assume that one of the valves 13 and 14 remains closed while the other is opening and then closing. In normal internal combustion engines of the four-stroke cycle the overlap period during which both inlet and exhaust valves are partially open at the same time for a short period does not influence the functioning of the mechanism. Thus during the opening operation of the inlet valve 13 the arm 25 is lifted by the appropriate push rod 28 and rotates the sleeve 23 so as to depress the arm 18 and open the valve. During this angular movement of the sleeve 23 the torsional stress in the torsion bar 30 is increased, and consequently the reaction upon the cap 33 becomes greater than the opposite reaction exerted upon the cap 38 by the torsion bar 32; as a result the thrust member 41 moves to the right, thus twisting the cap 38 and placing the torsion rod 32 under additional stress. Incidentally this increases the upward force upon the arm 19 and consequently holds the valve 14 more strongly in its closed position, but, of course, the practical advantage of the improved arrangement is the fact that both of the torsion bars 30 and 32 become additionally stressed by the opening movement of either one of the valves, so that each individual one needs to withstand only half the angular deflection of the arm 25 or the arm 26, since the deflection of either one of the arms is shared substantially equally by both of the torsion bars 30 and 32. It will be realised, of course, that the arms 25 and 18, together with the sleeve 23 connecting them, act as a simple rocker to operate the valve 13, and at the same time the sleeve 23 serves as a housing for the torsion bar 30 so as to protect it from damage; this, of course, also applies to the arms 26 and 19, together with the sleeve 24 and the torsion bar 32.

In the modified arrangement which is illustrated diagrammatically in plan in Figure 3 the torsion bars 30 and 32 have their end parts mounted rotatably in bearings 43. A depending arm 36, having a socket 37, is secured firmly to one end of the torsion bar 30, while a rocker 44 is similarly secured firmly to the other end of the torsion bar 30, said rocker having a bifurcated end 45 for engagement with the stem of the valve member 13, conveniently by means of flanges 17 and 20, as shown in Figure 1. The other end of the rocker 44 has a follower roller 46, which engages with a cam 47 mounted upon a rotating camshaft 48. The cam 47 is of suitable profile for operating also the exhaust valve 14, with which it is connected by means of a rocker 49 having a follower roller 50. The rocker 49 is secured to one end of the torsion bar 32, while the other end of the latter carries a depending arm 39 having at its extremity a socket 40. As in the previous example, the sockets 37 and 40 are connected together by an adjustable thrust member 41 adapted to provide, equalise, and adjust the reactions of the torsion bars 30 and 32, whereby both of said bars become additionally stressed during the opening movement of either one of the valves 13 and 14. Thus, in the arrangement shown in Figure 3, the reaction from each of the torsion bars 30 and 32 is transmitted to the other of said torsion bars, and as a consequence both become additionally stressed during the opening movement of either one of the valves 13 and 14. In order to make the action quite clear the arrows in Figure 3 show the directions of the twisting forces exerted by the respective ends of the torsion bars 30 and 32.

In the construction illustrated in Figure 4 the valve 13 is actuated in the usual manner by a rocker 44, which is mounted pivotally at 51 and has a roller 46 engaging with a corresponding cam 52 upon a camshaft 48. A second cam 53 operates a rocker 49 pivoted at 54 so as to open the valve 14. The spring influence for urging the valve 13 to its closed position comprises a torsion bar 30, which is mounted rotatably in bearings (not shown) and has at one end an arm 18 arranged to engage a flange 17 upon the valve 13 so as to urge said valve to its closed position owing to the twisting force exerted upon the arm 18 by the torsion bar 30 in the direction of the arrow 55. At the other or forward end the torsion bar 30 carries a depending arm 36, which is shown in broken lines, and which is connected at its lower end to the extremity of a tension link 56 arranged to be adjusted in length. A similar arrangement is used in connection with the valve 14, a torsion bar 32 being connected to said valve by an arm 19 and to the adjacent end of the link 56 by a depending arm 39. The length of the link 56 is adjusted during assembly to give the desired initial torsional load in the torsion bars 30 and 32, and when either of the valves 13 or 14 is opened the consequent increase in torsional stress is shared substantially equally by both of the bars 30 and 32. The directions in which the torsion bars 30 and 32 tend to urge the arms 36 and 39 respectively are indicated by the arrows 57.

If desired the invention may be carried into effect in a relatively simple manner by using a single torsion bar for urging a pair of valves to their closed position, the general arrangement being that indicated in Figure 5. A torsion bar 58, mounted rotatably in bearings 43, has arms 18 and 19 fastened securely to its end parts, said arms being bifurcated to embrace the stems of the two valves 13 and 14. During assembly the bar 58 is placed under torsional stress, so that its ends tend to twist relatively in the directions indicated by the arrows, thus causing the arms 18 and 19 both to be urged upwards for holding the valves 13 and 14 in their closed positions. It will be seen that when either of the valves 13 and 14 is opened, additional torsional stress is distributed along the whole length of the bar 58. The valves 13 and 14 shown in any of the embodiments may be those belonging to a single cylinder, or alternatively they may be associated with different cylinders of a multi-cylinder engine, said valves preferably, however, being arranged so that only one is substantially open at any instant in the engine cycle.

Although the invention has been described in connection with internal combustion engines, it will be uderstood that it is applicable to valve mechanism for various purposes, and it is especially useful where a high speed of operation is desirable. The invention is also applicable to cases where a plurality of valves are required to be operated in unison, such, for instance, as internal combustion engines having for each cylinder, a pair of inlet valves and a pair of exhaust valves. The valves themselves may be of any form having resilient means holding them in their normal position.

The improved resilient means are extremely simple in construction and are easy to install, for the requisite spring force can be imparted to the torsion bar after the whole of the valve mechanism has been assembled. Moreover the main part of the spring is well spaced from the hot cylinder head and can therefore be efficiently cooled, while its action is not impaired by dirt or other foreign matter which would, of course, clog a coiled compression spring. As the actual movement of the spring is negligible, inertia effects are very small, so that it is found to be very suitable for use with high speed engines, pumps and the like and also in cases where trouble has hitherto been encountered due to resonance.

What I claim is:

1. Valve operating mechanism for an internal combustion engine having a cylinder provided with reciprocable inlet and exhaust valves, first and second torsion shafts journaled in substantially parallel relation on said cylinder, inlet valve actuating lever means pivoted upon the axis of said first torsion shaft and secured to a first end thereof, exhaust valve actuating lever means pivoted upon the axis of said second torsion shaft and secured to a first end thereof, a pair of levers secured to the second ends of said torsion shafts, respectively, and having confronting ends and a push rod connecting the confronting ends of said pair of levers, opening of either valve being resisted by the combined torsion of said shafts acting in series through said push rod to hold the other valve in closed position.

2. Valve operating mechanism for an internal combustion engine having a cylinder provided with reciprocable inlet and exhaust valves, first and second torsion shafts journaled in substantially parallel relation on said cylinder, a first lever connected to the first end of said first shaft and effective to positively reciprocate said inlet valve in both directions, a second lever connected to the first end of said second shaft and effective to positively reciprocate said exhaust valve in both directions, third and fourth levers connected to the second ends of said torsion shafts and having confronting ends, respectively and a push rod connecting the ends of said third and fourth levers, movement of either said valve to open position being opposed by torsion in both rods acting in series, through said push rod to urge the other valve to closed position.

3. Valve operating mechanism for a machine having a power cylinder, and inlet and exhaust valves reciprocably carried by said cylinder, a pair of brackets mounted upon said cylinder, a first sleeve journaled in one said bracket, a second sleeve journaled in the other said bracket, the axis of said sleeves being substantially parallel, an operating connection between each said sleeve and a respective one of said valves, a first torsion shaft mounted within and secured at one end to, said first sleeve, a second torsion shaft mounted within, and secured at one end to, said second sleeve, a pair of levers each secured to the other ends of said shafts, respectively, said levers having their ends in confronting relation, and push rod interposed between said confronting ends, said torsion rods acting in series through said push rod to oppose the opening of either valve while urging the other valve into closed position.

4. In a valve mechanism for an internal combustion engine having a cylinder and intake and exhaust valves reciprocably mounted in said cylinder, first and second torsion shafts journaled on said cylinder in substantially parallel, side-by-side relation, first and second valve-operating rocker arms fixed on first, adjacent ends of the respective shafts, each said arm being connected positively to reciprocate its corresponding valve in both directions of reciprocation, a pair of levers, each being fixed to the second end of a respective shaft, said levers being substantially coplanar and having their ends in confronting relation, and a push rod interposed between said confronting ends and operative to cause said levers to oscillate in synchronism, opening of either valve being opposed by the torsion of said rods acting in series, to urge the other valve into closed position.

5. In a valve operating mechanism for an internal combustion engine having a cylinder and a poppet valve in said cylinder, a pair of torsion shafts journaled on said cylinder in substantially parallel, side-by-side relation, a pair of arms each fixed to a respective shaft at corresponding first ends thereof, a push rod interposed between the ends of said arms and effective to cause said arms to oscillate in unison, rocker arm means on the second end of one said shaft and connected to positively reciprocate said valve in both directions, and means fixing the first end of the other said shaft against rotation in response to movement of said rocker arm to open said valve.

GEORGE FREDERIC HALLIDAY.